United States Patent Office
2,824,873
Patented Feb. 25, 1958

2,824,873

PRODUCTION OF PYRIDAZONE DERIVATIVES

Kaethe Bartram, Ludwigshafen (Rhine), Germany, assignor to Badische Anilin- & Soda-Fabrik Aktiengesellschaft, Ludwigshafen (Rhine), Germany No Drawing. Application May 1, 1956
Serial No. 581,850

Claims priority, application Germany May 7, 1955

7 Claims. (Cl. 260—247.5)

This invention relates to an improved process for the production of new pyridazone derivatives.

We have found that new, therapeutically valuable pyridazone derivatives are obtained by reacting beta-propionylpropionic acid with phenylhydrazine, treating the resultant 2-phenyl-6-ethylpyridazinone-(3) with a halogenating agent and allowing a secondary amine to act on the 4-halogen-2-phenyl-6-ethylpyridazone-(3) thus obtained.

The reaction may be formulated as follows:

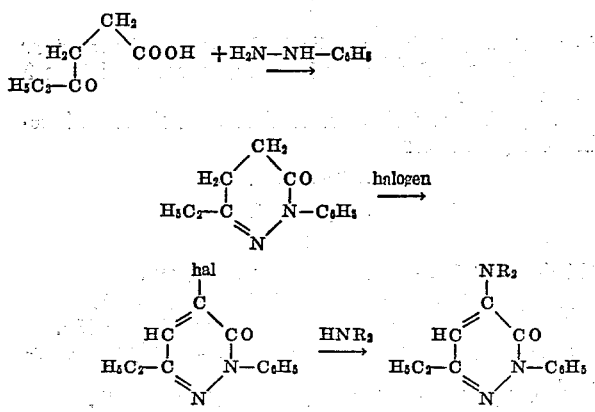

As secondary amines (HNR₂) there may be used for example lower dialkylamines such as dimethylamine, diethylamine, methylethylamine, di-isopropylamine, pyrrolidine, piperidine, morpholine or hexamethylene imine.

The beta-propionylpropionic acid serving as initial material is accessible technically by catalytic reaction of 2 mols of ethylene with 2 mols of carbon monoxide and 1 mol of water by the processes described in U. S. Patent specification Nos. 2,562,393 and 2,577,208.

The reaction of this gamma-keto acid with phenyl hydrazine is effected by heating about equimolecular amounts of the components, preferably in an indifferent solvent, such as benzene, toluene or chlorbenzene. An addition of a basic agent, such as pyridine or triethanolamine, promotes the reaction and increases the yield of 2-phenyl-6-ethylpyridazinone-(3).

This compound is then treated, preferably in an inert diluent, such as chlorbenzene or phosphorus oxychloride, with a halogenating agent, dehydrogenating halogenation thus taking place. As halogenating agents there are suitable for example excess phosphorus pentachloride or pentabromide for example 3 to 5 mols thereof or free chlorine or bromine in the presence of catalytic amounts of the said phosphorus halides. It is preferable to add also an aluminum halide, for example 0.5 mol thereof. The 2-phenyl-6-ethyl-pyridazinone-(3) may also first be dehydrogenated for example with chlorine, bromine or sulfuryl chloride without the addition of phosphorus pentahalide to form 2-phenyl-6-ethylpyridazone-(3), the latter then being subjected to substituting halogenation, for example with phosphorus pentachloride or with chlorine in the presence of a small amount of phosphorus pentachloride.

The reaction of the 4-halogen-2-phenyl-6-ethylpyridazone-(3) thus obtained with the said secondary amines already takes place rapidly and smoothly at room temperature. It is preferable to work in a solvent, such as methanol. To bind the hydrogen halide split off, a basic agent is added, such as triethylamine or pyridine; an excess of the secondary amine may also be used.

The new pyridazone derivatives accessible in good yields in the said manner are characterized by high analgesic, antiphlogistic and spasmolytic action.

It is already known that by reaction of levulinic acid, with phenyl hydrazine, 2-phenyl-6-methyl-pyridazinone-(3) is obtained (E. Fischer, Liebigs Ann. Chem. 236, 147; yields of only about 60% of the theoretical yield are obtained. From 2-phenyl-6-methyl-pyridazinone-(3), by fusion with phosphorus pentachloride, 4-chlor-2-phenyl-6-methylpyridazone-(3) has been prepared in a yield of 25 to 30% of the theoretical yield (Ach, Liebigs Ann. Chem. 253, 47), and this has been reacted with dimethylamine to form 4-dimethylamino-2-phenyl-6-methyl-pyridazone-(3) (British patent specification No. 656,228). The process according to this invention, which starts from the more readily technically accessible beta-propionylpropionic acid, yields the hitherto unknown 6-ethyl-4-amino-2-phenyl-pyridazone-(3) in better yields; the pharmacological properties of the new pyridazone derivatives are superior to those of the product known from the British patent specification No. 656,228.

The following examples will further illustrate this invention but the invention is not restricted to these examples. The parts specified are parts by weight.

Example 1

65 parts of beta-propionylpropionic acid, 80 parts of toluene and 53 parts of phenyl hydrazine are heated for 2 hours at 60° C. with an addition of 3 parts of triethanolamine. The toluene is then distilled off together with the water formed and the residue is heated under reduced pressure for 2 hours at 160° C., another about 8 parts of water thereby distilling off. After cooling, it is diluted with ether and the ethereal solution washed with water. After evaporating the ether, the whole is fractionally distilled under reduced pressure. The main fraction passes over at 165° to 171° C. under a pressure of 2 Torr. 75 parts of 2-phenyl-6-ethylpyridazinone-(3) are obtained.

A solution of 300 parts of this product in 330 parts of chlorbenzene is introduced while stirring into a suspension of 1,500 parts of phosphorus pentachloride in 550 parts of chlorbenzene which has been heated to 70° to 80° C. The mixture is heated in the course of 30 minutes to 120° C., about 300 parts of phosphorus trichloride thus distilling off. The reaction mixture is then poured onto about 4,000 parts of ice and extracted with ether. After distilling off the ether and the chlorbenzene the residue is boiled up with cyclohexane. By cooling the cyclohexane solution, 2-phenyl-6-ethyl-4-chlorpyridazone-(3) crystallizes out; it can be purified by recrystallization from cyclohexane or from a mixture of water and alcohol. It melts at 79° to 81° C. The yield amounts to 220 parts (64% of the theoretical yield).

145 parts of 2-phenyl-4-chlor-6-ethylpyridazone-(3) are boiled under reflux for 24 hours with 90 parts of pyrrolidine in 350 parts of toluene. After cooling, the precipitated pyrrolidine hydrochloride is filtered off by suction and the toluene distilled off under reduced pressure. The residue is washed with water and distilled.

The 2-phenyl-4-pyrrolidino-6-ethylpyridazone-(3) passes over at 215° to 220° C. at a pressure of 4 Torr. It solidifies to crystals melting at 58° to 59° C. The yield amounts to 110 parts.

Example 2

30 parts of the 2-phenyl-4-chlor-6-ethylpyridazone-(3) obtained according to paragraph 2 of Example 1 are allowed to stand for about 20 hours at room temperature with a solution of 250 parts of dimethylamine in 200 parts of methanol. To complete the reaction, the whole is heated to 45° to 50° C. for a further 3 hours. After distilling off the solvent and the excess of dimethylamine, there remains a residue which is taken up in ether. The dimethylamine hydrochloride thereby separating is filtered off by suction and the ether evaporated. The residue, consisting of 2-phenyl-4-dimethylamino-6-ethylpyridazone-(3), yields crystals melting at 52° to 53° C. after recrystallization from cyclohexane or from a mixture of alcohol and water.

A pharmacological comparison of 2-phenyl-4-dimethylamino-6-ethylpyridazone-(3) with the known 2-phenyl-4-dimethylamino-6-methylpyridazone-(3) gave the following results:

In an analgesic test on mice (heat stimulus method), the normal reaction time of the mice was prolonged by the following maximum values:

|  | Dosage, 100 mg./ kg., percent | Dosage, 80 mg./ kg., percent |
|---|---|---|
| 6-ethyl | 75 | 69 |
| 6-methyl | 68 | 31 |

The antipyretic action is measured in rabbits in which a high fever has been artificially induced. At the moment of highest fever, the relative fall in temperature produced by 50 mg./kg. was −1.95° C. with the 6-ethyl derivative as compared with −0.8° C. with the known 6-methyl derivative.

Example 3

The 2-phenyl-4-chlor-6-ethylpyridazone-(3) obtained according to Example 1 is reacted with hexamethylene imine as in Example 1. 2-phenyl-4-hexamethyleneimino-6-ethylpyridazone-(3) of the boiling point 204° to 206° C. at a pressure of 1 Torr. is thereby obtained.

2-phenyl-4-morpholino-6-ethylpyridazone-(3), prepared in the analogous manner by the use of morpholine, forms crystals at the melting point 78° to 79°.

Example 4

A solution of 75 parts of 2-phenyl-6-ethylpyridazinone-(3) prepared according to paragraph 1 of Example 1 in 120 parts of tetrachlorethane is allowed to flow at 70° to 80° C. into a suspension of 250 parts of phosphorus pentachloride and 35 parts of aluminium chloride in 480 parts of tetrachlorethane. The reaction mixture is heated to 120° C., a part of the phosphorus trichloride formed thereby being distilled off. The product is then evaporated at reduced pressure and the residue decomposed with ice. After standing for some time, the mass is converted into a stiff crystal pulp of 2-phenyl-4-chlor-6-ethylpyridazone-(3) which is filtered off by suction and washed with water. The yield amounts to 75 parts. The reaction with amines, such as pyrrolidine, dimethylamine, morpholine or diethylamine, is effected as in the preceding examples.

I claim:

1. Pyridazone derivatives of the general formula

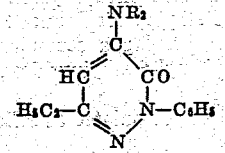

in which —NR₂ is the radical of a saturated secondary amine, the two R together having a sequence of from 2 to 6 members.

2. Pyridazone derivatives as claimed in claim 1 wherein —NR₂ stands for

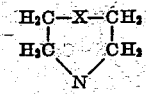

X being =, CH₂, —CH₂—CH₂— and oxygen.

3. 2-phenyl-4-pyrrolidino-6-ethylpyridazone-(3).
4. 2-phenyl-4-dimethylamino-6-ethylpyridazone-(3).
5. 2-phenyl-4-hexamethyleneimino-6 - ethylpyridazone-(3).
6. 2-phenyl-4-morpholino-6-ethylpyridazone-(3).
7. 2-phenyl-4-ethylamino-6-ethylpyridazinone-(3).

References Cited in the file of this patent

FOREIGN PATENTS 656,228     Great Britain     Aug. 15, 1951